3,446,256
POSITIONING MECHANISM
Thomas E. Roberts, Jr., Saratoga, and Robert K. Houston, Santa Clara, Calif., assignors to FMC Corporation, San Jose, Calif., a corporation of Delaware
Filed May 1, 1967, Ser. No. 635,238
Int. Cl. B27m *3/00;* B27d *5/00;* B62d *5/02*
U.S. Cl. 144—2                                             10 Claims

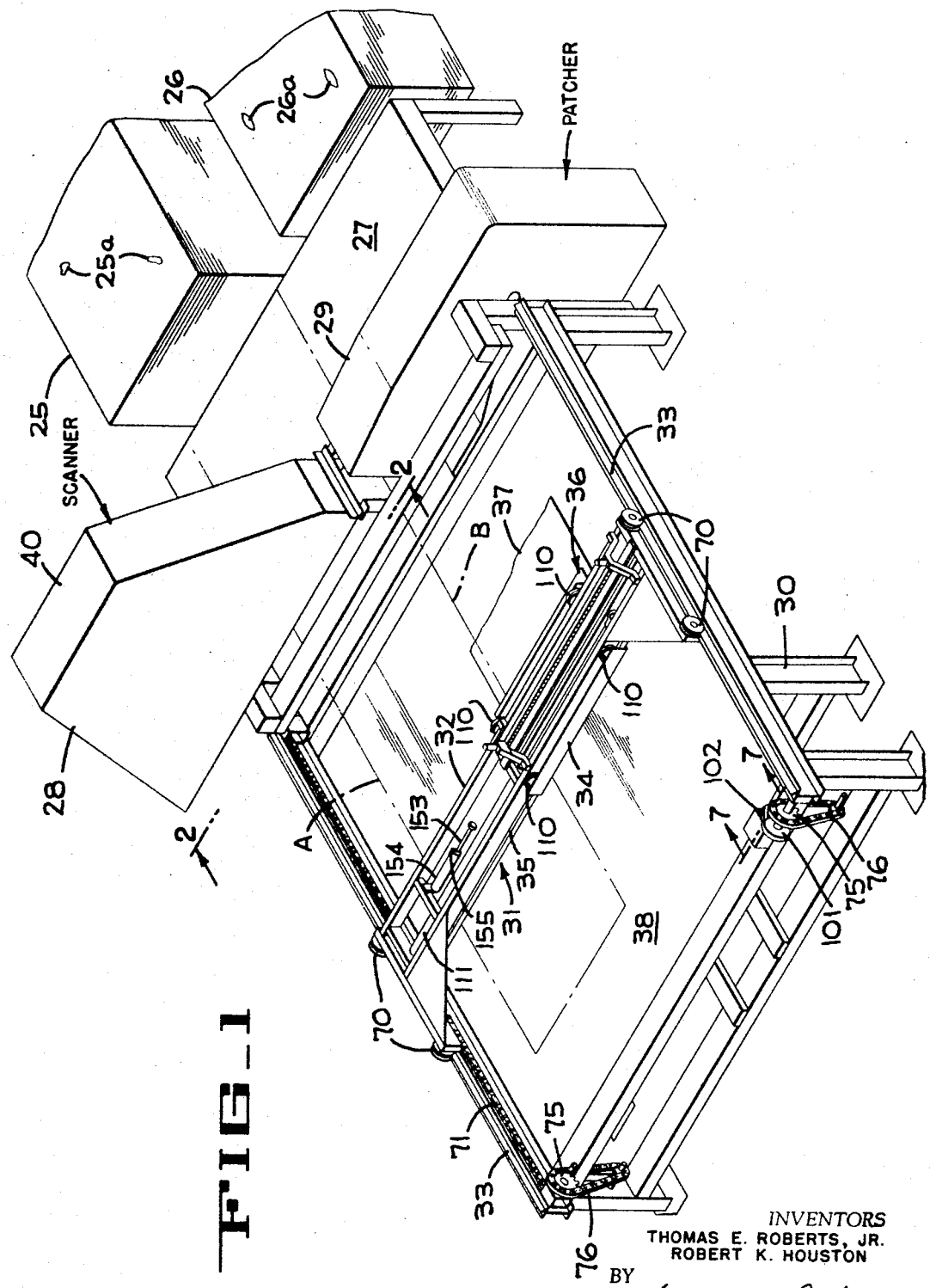

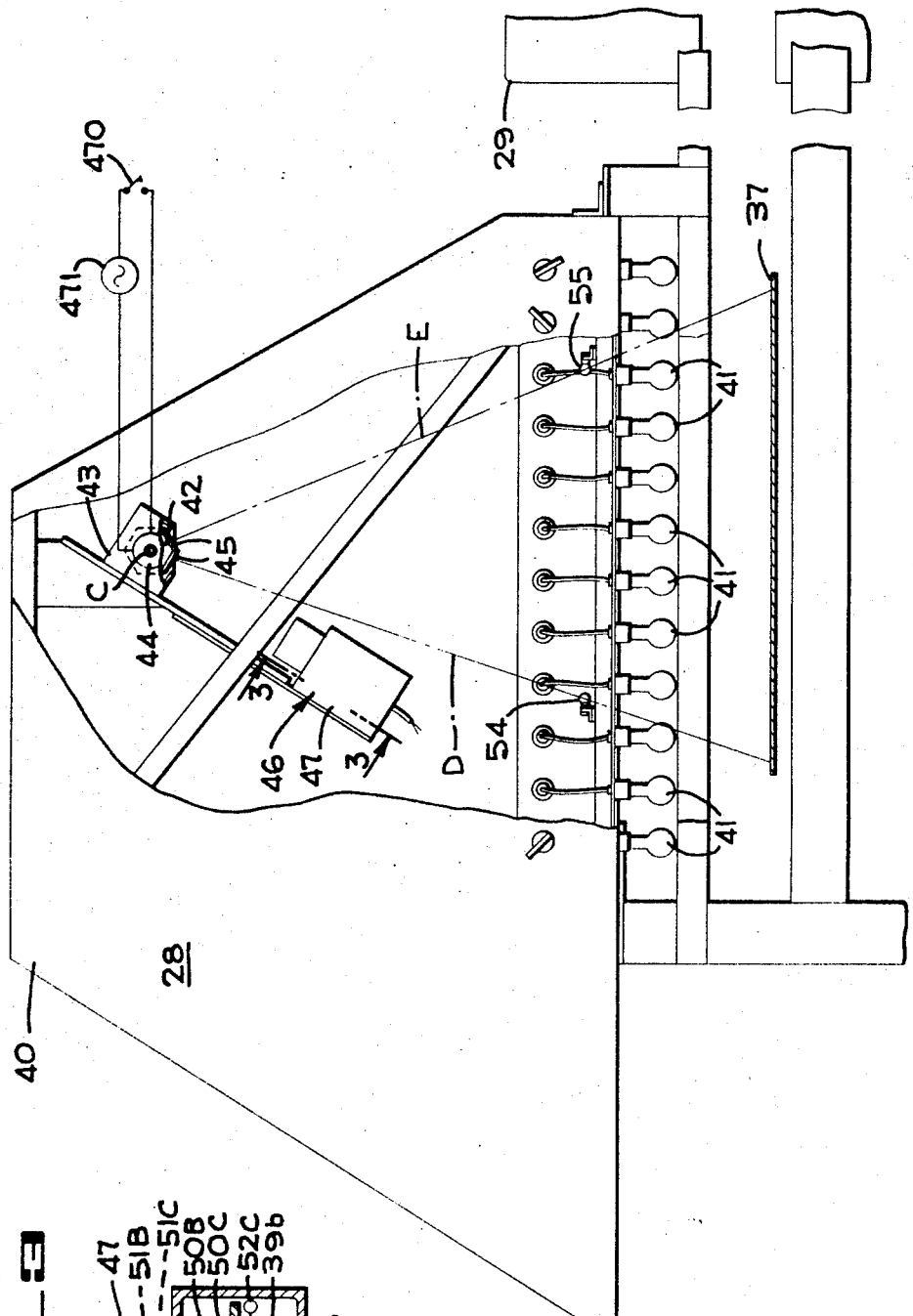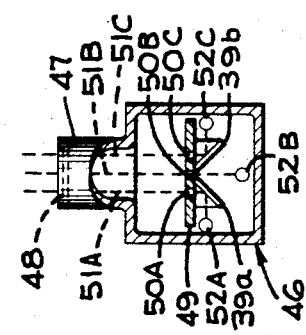

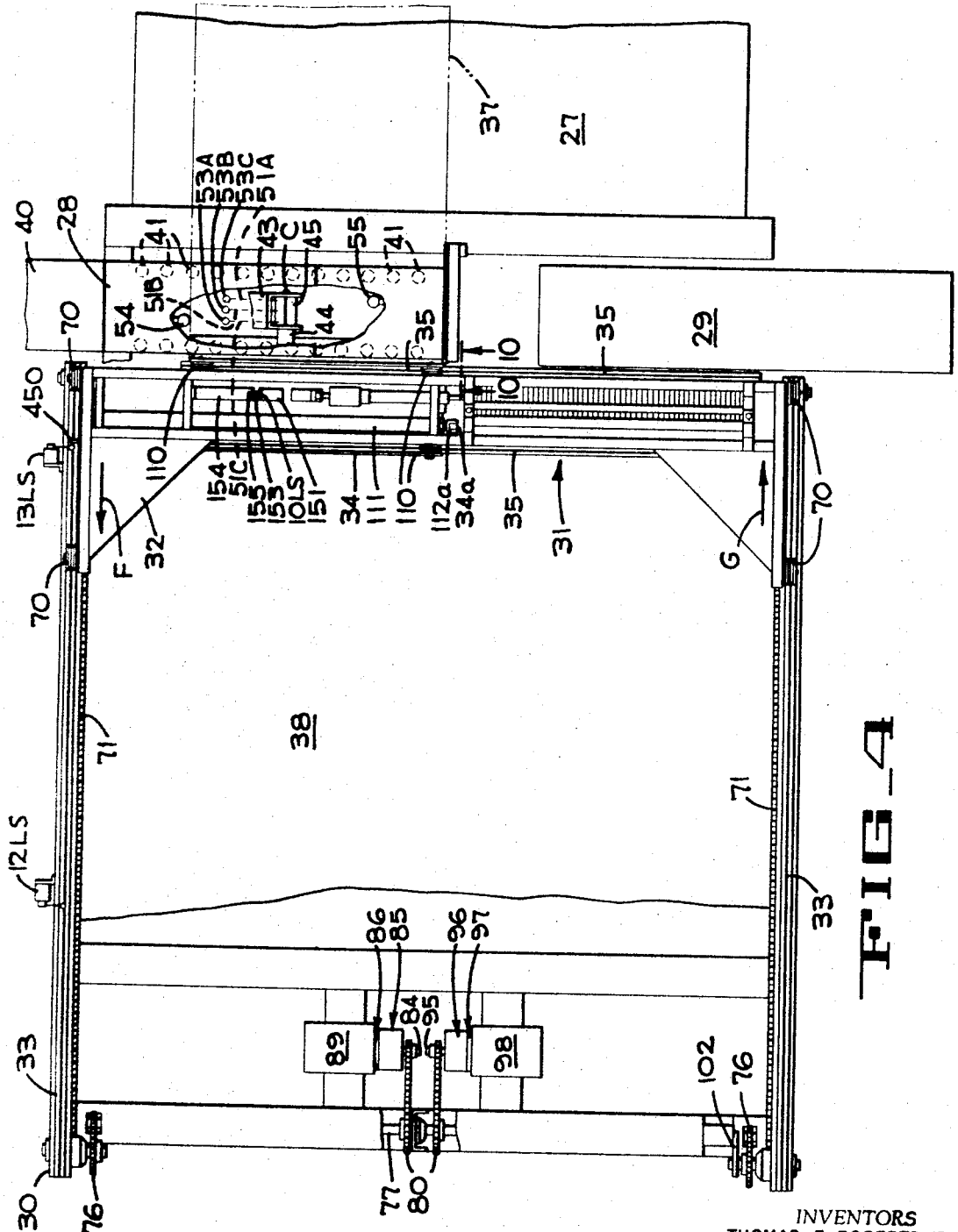

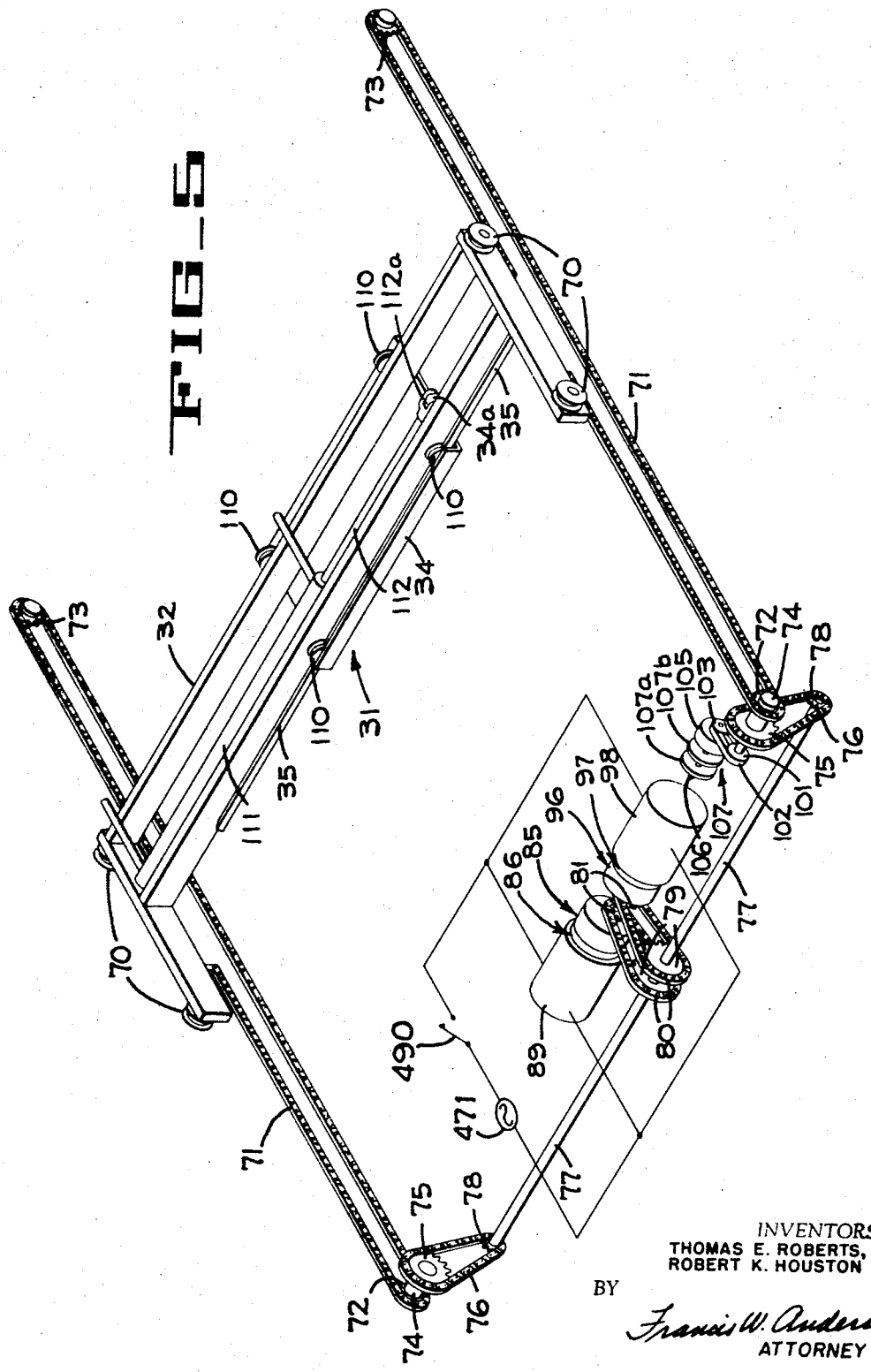

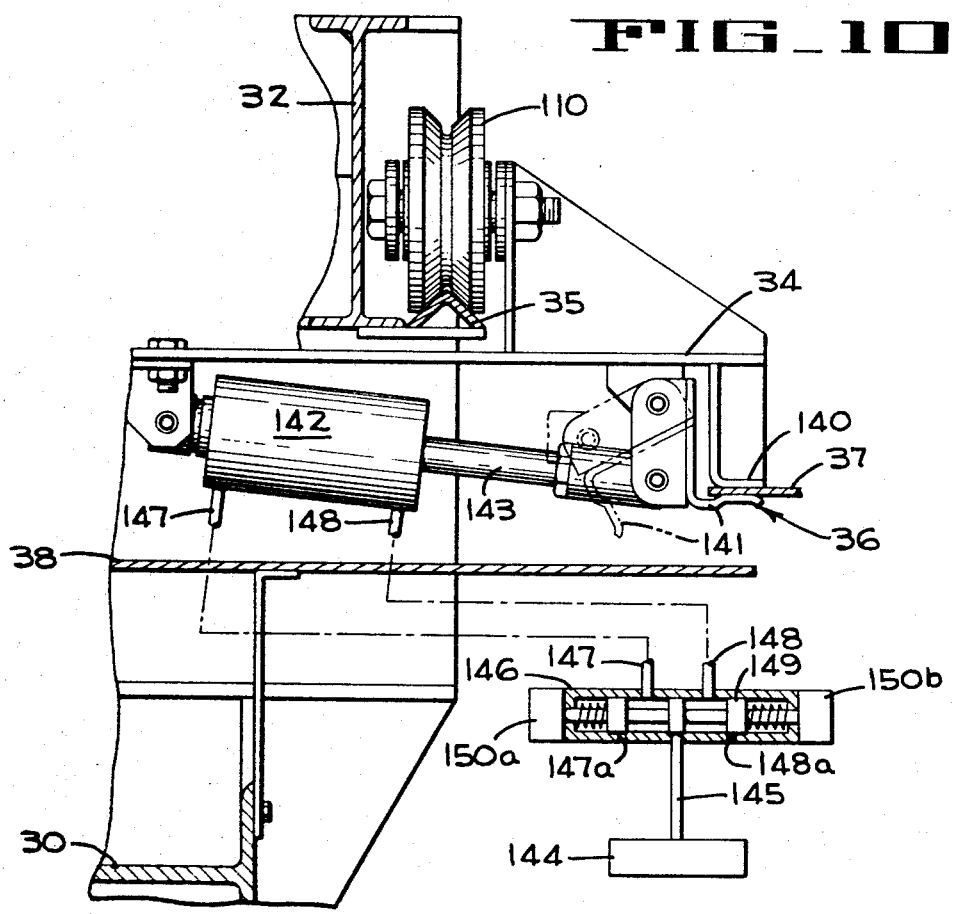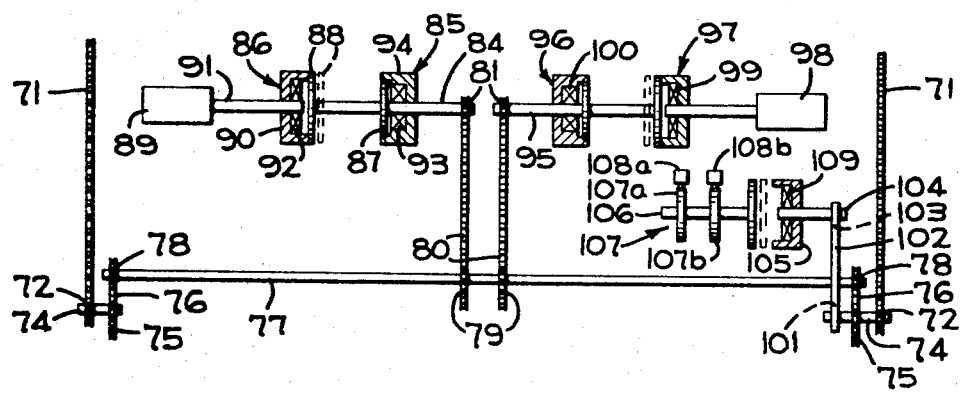

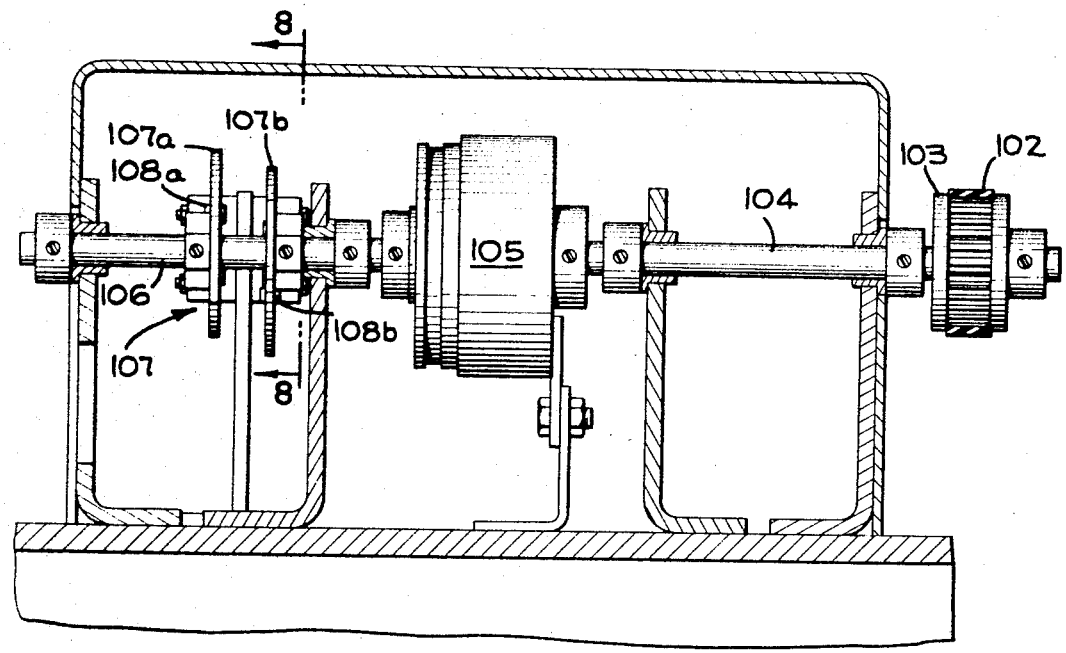
FIG_7
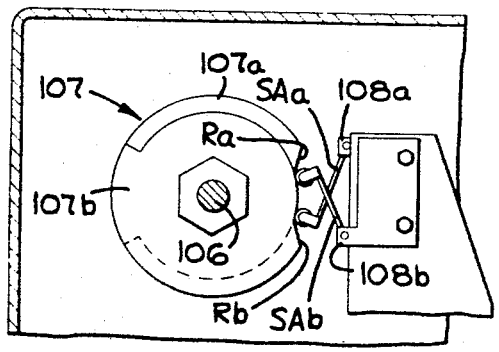
FIG_8
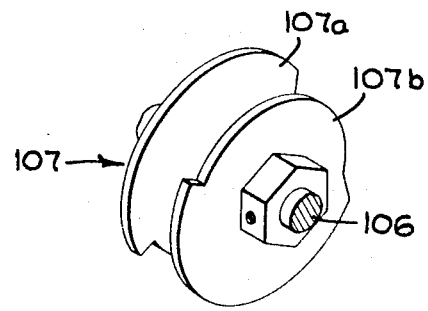
FIG_9
INVENTORS
THOMAS E. ROBERTS, JR.
ROBERT K. HOUSTON
BY
*Francis W. Anderson*
ATTORNEY

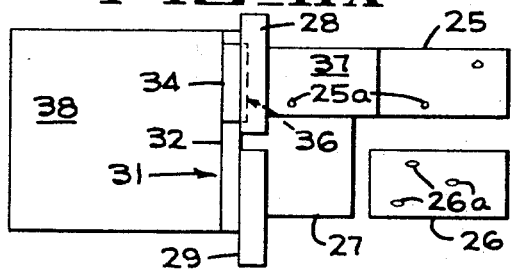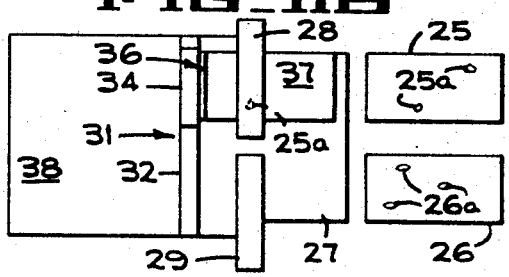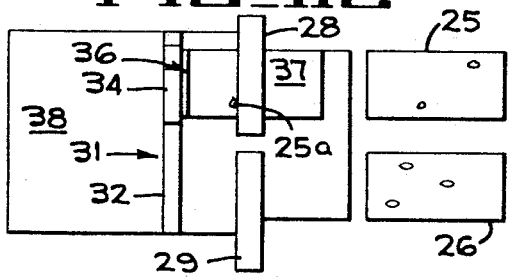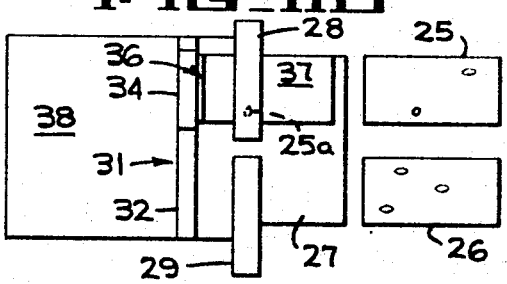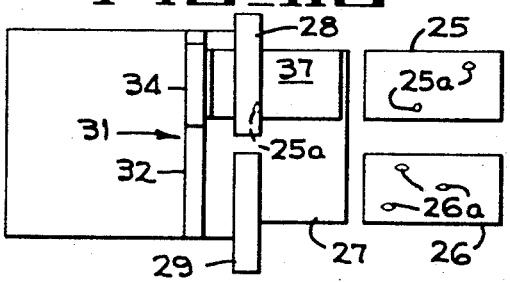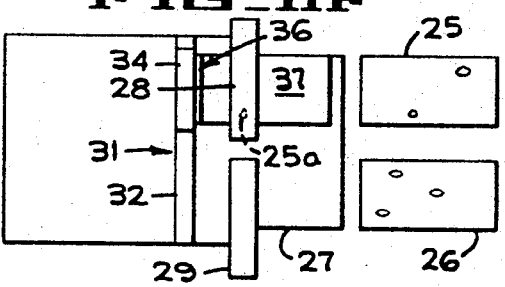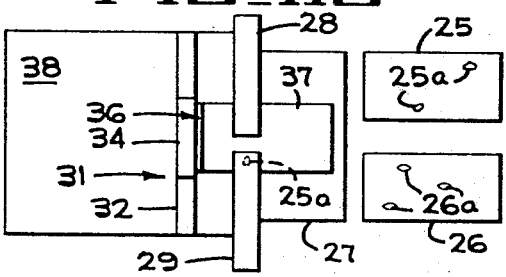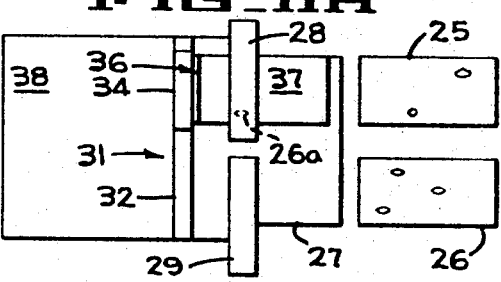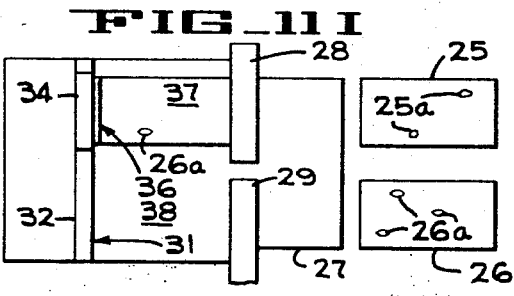

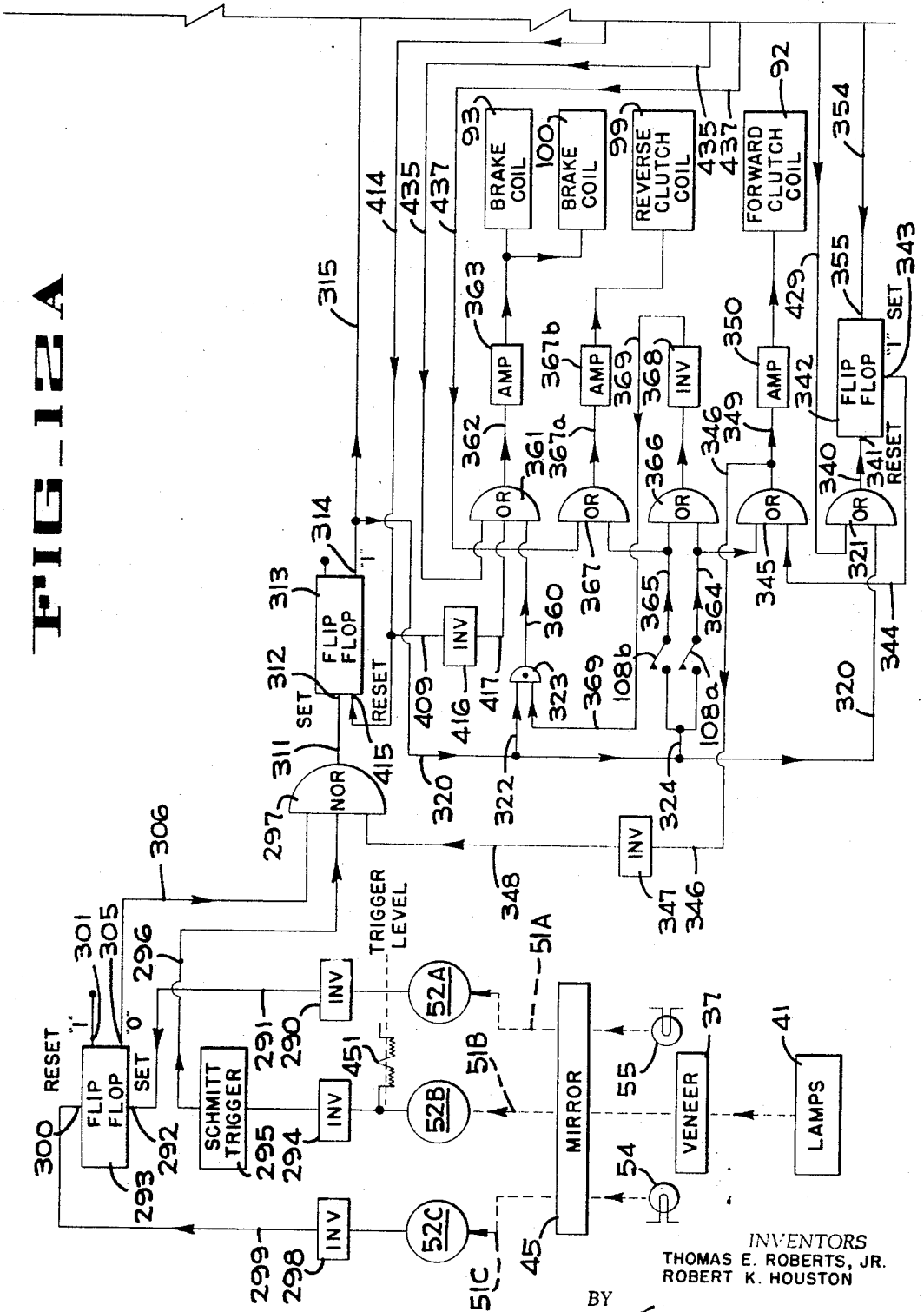

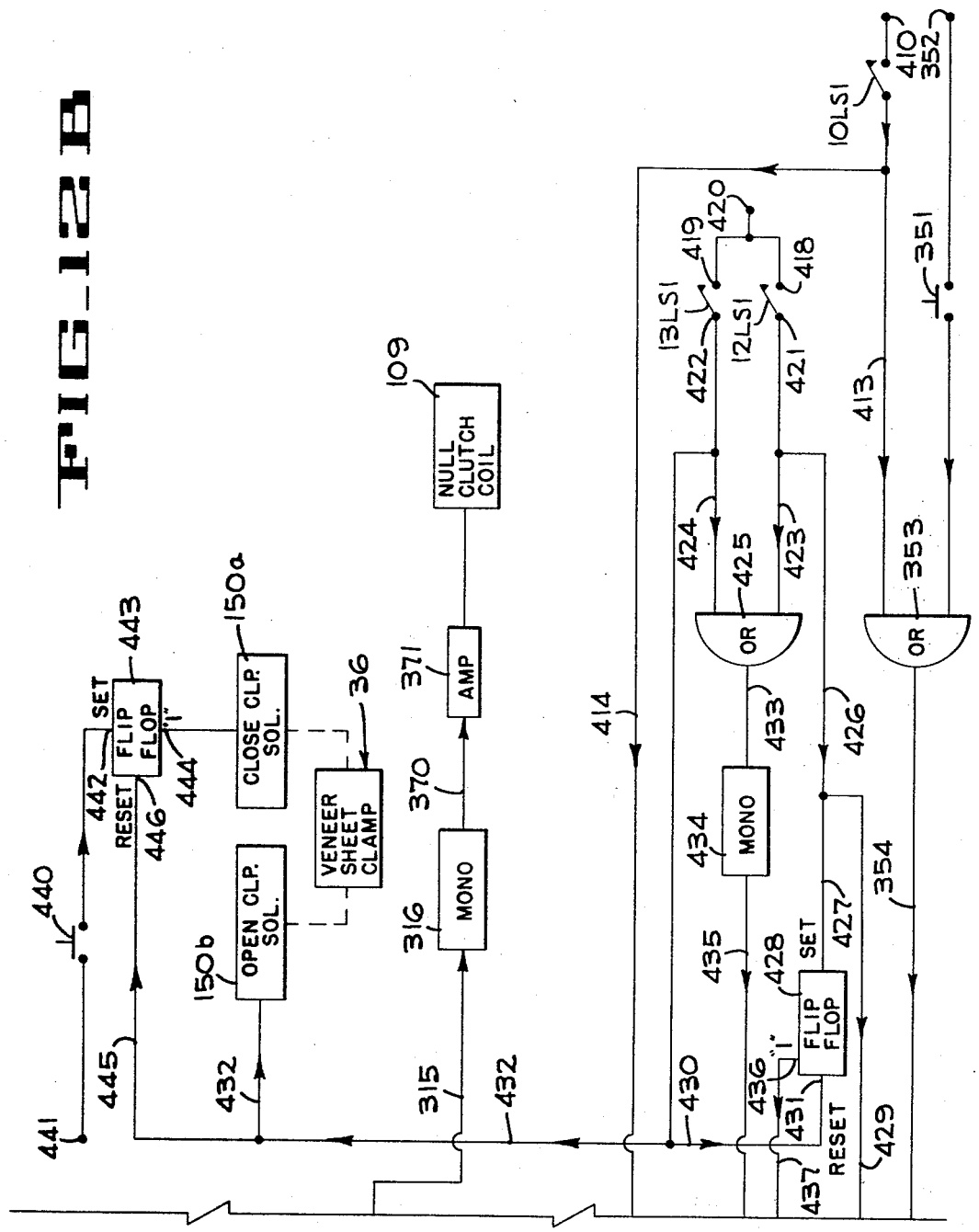

ABSTRACT OF THE DISCLOSURE

An automatic plywood patching machine has a scanner to detect defects and a patcher laterally spaced therefrom to patch the defects. The plywood is moved longitudinally under the scanner by travel of a longitudinal carriage which has a cross carriage thereon to carry the plywood to and from the patcher. A cam mechanism, resting in a null position, is connected to the drive system of the longitudinal carriage by a clutch which is operated in response to the scanner when a defect is detected. When the inertia of the carriage rotates the cam mechanism out of the null position, two motors and a brake are alternately operated by the cam mechanism to return the carriage to a null position. The carriage is then moved laterally to the patcher.

CROSS-REFERENCES TO RELATED APPLICATIONS

The present application discloses a positioning mechanism incorporated in a machine for automatically detecting and patching plywood veneer sheets. Certain features disclosed in this application are also disclosed in one or more of the following copending applications, filed on even date herewith, and assigned to the same assignee as the present invention: Ser. No. 634,951, filed May 1, 1967; Ser. No. 635,220, filed May 1, 1967; Ser. No. 635,113, filed May 1, 1967; Ser. No. 635,239, filed May 1, 1967; and Ser. No. 635,221, filed May 1, 1967.

BACKGROUND OF THE INVENTION

The present invention relates to mechanism for stopping a moving member in a precise position, the mehcanism being particularly suitable for an automatic plywood patching machine.

In an automatic plywood patching machine, a longitudinal drive mechanism moves a sheet of plywood veneer longitudinally under a scanner. The scanner, which scans across the sheet in passes which are longitudinally displaced by virtue of the longitudinal movement of the plywood veneter, is capable of detecting a defect in the veneer. When a defect is detected, the veneer is shifted laterally by a transverse, or cross carriage to a patcher which patches the defect. The veneer is then returned to the scanner, and scanning resumed at the point on the veneer where the scanning was previously interrupted.

If the patcher, although spaced laterally from the scanner, is in the same longitudinal position as the scanner, veneer can be shifted laterally, without longitudinal movement, from the scanner to the patcher and from the patcher to the scanner. When this is done, scanning can be resumed without leaving a gap on the veneer which was not scanned.

The inertia of the longitudinally moving veneer and the driving mechanism therefor makes is impossible to stop the driving mechanism the instant a defect is detected. Thus, the veneer moves a short distance beyond the longitudinal position of the scanner and patcher. The mechanism of the present invention, however, quickly returns the veneer to the precise longitudinal position at which the defect was detected.

SUMMARY OF THE INVENTION

In brief, in the preferred form of the invention, the longitudinal drive system includes two continuously running electric motors each having an electrically operated clutch. When one clutch is energized the longitudinal drive mechanism is powered by one of the motors (which can be referred to as a forward motor) to drive the veneer in the forward directional sense; when the other clutch is energized, the drive mechanism is powered by the other motor (which can be referred to as a reverse motor) to drive the veneer in the opposite directional sense. During the scanning, the veneer is moved forwardly by the forward motor until a defect is detected.

A cam mechanism is provided which is automatically connected to, and disconnected from, the longitudinal drive system. The cam mechanism assumes a null position when disconnected from the drive position. When the cam mechanism is connected to the longitudinal drive system, the cam mechanism rotates in one direction from the null position when the veneer is driven in one directional sense and rotates in the opposite direction when the veneer is driven in the opposite directional sense.

When a defect is detected, the cam mechanism which is small, is automatically instantly engaged with the drive mechanism by a small clutch with little inertia, and the forward and reverse motor are placed under the control of the cam mechanism. As the inertia of the veneer and driving mechanism carries the veneer beyond the longitudinal position of the defect, the cam mechanism rotates in the forward direction out of the null position. The rotation of the cam mechanism in the forward direction energizes the clutch of the reverse motor, and deenergizes the clutch of the forward motor to reverse direction of the drive mechanism and reverse direction of rotation of the cam mechanism. When the veneer returns to the longitudinal position where the patch was detected, the cam mechanism will be back to the null position, and the clutch of the reverse motor will be deenergized. Braking mechanism, which is operated in response to the cam mechanism, is engaged with the drive mechanism when the cam is in the null position. If, however, the veneer should overshoot the desired longitudinal position, the cam mechanism will rotate beyond the null position, and deenergize the reverse motor. Simultaneously, the cam mechanism reenergizes the forward motor, and again applies the braking mechanism when the veneer reaches the desired longitudinal position. Thus, the cam mechanism defines a memory system which is triggered by the scanner and which operates to return the veneer to the longitudinal position where the defect was detected.

It is therefore one object of the present invention to provide mechanism to stop a moving member in a precise position. It is another object of the present invention to provide mechanism in an automatic plywood patching machine to stop a longitudinally moving sheet of plywood in the longitudinal position where a defect is detected by a scanner. It is yet another object of the present invention to provide a memory for a longitudinally moving sheet of plywood to return the plywood to the precise longitudinal position where a defect was detected.

BRIEF DESCRIPTION OF THE DRAWINGS

FIGURE 1 is a view of perspective of an automatic plywood patching machine incorporating the mechanism of the present invention;

FIGURE 2 is a view taken on the line 2—2 of FIGURE 1;

FIGURE 3 is a view taken on the line 3—3 of FIGURE 2;

FIGURE 4 is a plan view of the mechanism of FIGURE 1;

FIGURE 5 is a schematic view of the drive mechanism of the machine of FIGURE 1, with some parts omitted for clarity;

FIGURE 6 is a schematic diagram of a part of the drive mechanism shown in FIGURE 5;

FIGURE 7 is a view taken on the line 7—7 of FIGURE 1;

FIGURE 8 is a view taken on the line 8—8 of FIGURE 7;

FIGURE 9 is a view in perspective of the cam mechanism shown in FIGURE 8;

FIGURE 10 is a view taken on the line 10—10 of FIGURE 4;

FIGURES 11A to 11I show a sheet of plywood veneer as it progresses through the machine of FIGURE 1 for patching; and FIGURES 12A and 12B are schematic diagrams of the control mechanism for the machine of FIGURE 1.

DESCRIPTION OF THE PREFERRED EMBODIMENT

There is shown in FIGURE 1 an automatic plywood veneer patching machine incorporating the mechanism of the present invention. A stack 25 of unprocessed plywood veneer sheets (with defects indicated at 25a) and a stack of 26 of patched plywood sheets (with paches indicated at 26a) are shown adjacent a table 27 at the front end of the machine. A scanner 28 is positioned over the path of a plywood sheet fed into the machine, and a patcher 29 is located beside the scanner. The machine has a frame 30 which extends behind the scanner and supports a sheet carrier, indicated generally at 31. The sheet carrier comprises a longitudinal carriage 32 received on spaced apart, longitudinal, parallel ways 33 of frame 30, and a transverse, or lateral, carriage 34 received on spaced apart, transverse, parallel ways 35 of longitudinal carriage 32. A clamp 36 mounted on transverse carriage 34 is adapted to grip the leading edge of a plywood veneer sheet 37 for longitudinal movement of the sheet along a longitudinal path (bounded by lines A and B) and for lateral movement of the sheet from said path to the patcher 29 whenever a defect in the sheet 37 is detected by the scanner 28. The frame 30 has a horizontal bed plate 38 mounted thereon which extends under the scanner to table 27. The bed plate 38 lies in the same plane as the top of table 27 and partially supports a sheet 37 gripped by clamp 36.

As shown in FIGURES 1, 2 and 4, the scanner 28 has a housing 40 in the lower end of which two parallel rows of lamps 41 are mounted. The bottom of the housing is open so that the light from lamps 41 is cast downwardly onto a sheet of veneer 37 which is moved by the sheet carrier under the scanner. The scanner has a mirror holder 42 of hexagonal cross-section which is mounted on a bracket 43 connected to the scanner housing 40. The mirror holder 42 is rotated clockwise (as viewed in FIGURE 2) about a central axis C by electric motor 44 which is mounted on bracket 43. Six mirrors 45, mounted on the mirror holder 42, reflect light from the veneer sheet into a sensing member 46.

The sensing member 46 has a housing 47, as shown in FIGURE 3, in the upper end of which a lens 48 is mounted. The lens 48 focuses light from the veneer sheet onto a line on a masking plate 49 which is mounted in housing 47. The line on which the light focuses extends in the direction of plywood veneer travel (that is, longitudinally) and the masking plate has three apertures 50A, 50B, 50C on that longitudinal line. The light which passes through the center aperture 50B (designated as light path 51B) strikes a photomultiplier tube 52B behind the masking plate and in line with aperture 50B. Two prisms 39a, 39b are secured to the rear of the masking plate over apertures 50A and 50C to direct the light (designated as light paths 51A and 51C, respectively) passing through those apertures to the photomultiplier tubes 52A and 52C, which are behind the masking plate but in line with the apertures 50A and 50C.

With this arrangement, light from three small spots 53A, 53B, 53C (each, say ³⁄₁₆ of an inch in diameter) on the veneer sheet is reflected at any given instant by one of the mirrors 45 through the three apertures to act, respectively, on the three photomultiplier tubes 52A, 52B, and 52C. Since the three apertures on the masking plate 49 are spaced apart in the longitudinal direction (say, for example, ⅓ inch between each aperture) the three spots seen at any instant by the photomultiplier tubes will be longitudinally spaced, say two inches apart. Since the electric motor 44 runs continuously during operation of the machine, the photomultiplier tubes sense successive spots laterally across the veneer sheet (from right to left as viewed in FIGURE 2). After one mirror has completed one lateral pass across the veneer sheet, the next mirror begins the next pass. The veneer sheet will have moved longitudinally from the beginning of one pass to the beginning of the next pass (say, for example, a distance of 0.04 inch) so that successive lateral scans, or passes, will be longitudinally displaced, and, therefore, the entire veneer sheet will be scanned. It should be noted that thes scanning spot size is such that the lateral passes, although longitudinally displaced one from the other, overlap so that the entire surface of the sheet 37 (except the edges which cannot be patched) will be scanned for defects.

Two lamps 54 and 55 are mounted in the scanner housing 40. Lamp 54 is mounted in an imaginary line D extending between the axis C of rotation of the mirror holder 42 and the left edge of a sheet 37 (as viewed in FIGURE 2) passing under the scanner. Lamp 55 is mounted in an imaginary line E extending between the axis C of rotation of the mirror holder 42 and the right edge of a sheet 37 (as viewed in FIGURE 2) passing under the scanner. As shown best in FIGURE 4, lamp 55 is in light path 51A at the beginning of a lateral pass across the veneer sheet and lamp 54 is in light path 51C at the end of a lateral pass across the veneer sheet. Lamp 55 acts only on photomultiplier tube 52A and lamp 54 acts only on photomultiplier tube 52C. Lamp 55 acts as an indicator which establishes a fixed reference point at the beginning of each scanning pass and lamp 54 acts as an indicator which establishes a fixed reference point at the end of each scanning pass. Effective scanning occurs only between the boundaries E, D defined by the lamps 55, 54. It is only photomultiplier tube 52B which senses the condition of the veneer, which it does by responding to the different character of the light reflected from a defect to produce a signal.

As shown in FIGURE 1, the longitudinal carriage 32 has four flanged rollers 70 which ride on the tracks, or ways, 33. As shown best in FIGURE 5, one end of a chain 71 on each side of carriage 32 is connected to the rear of the carriage 32, and the other end of the chain is connected to the front of the carriage 32. Each of the two chains 71 is received over a sprocket 72 mounted on the rear of the frame 30 and over a sprocket 73 mounted on the front of the frame 30. Each sprocket 72 is connected by stub shaft 74 to sprocket 75 which receives a chain 76. A shaft 77, journaled in the frame 30, has two sprockets 78 secured thereon which receive, respectively, the chains 76. The shaft 77 also has two sprockets 79 secured thereon which are connected, respectively, by chains 80 to sprocket 81.

As shown best in FIGURE 6, one of the sprockets 81 is mounted on shaft 84 which extends through brake 85 to clutch 86. The brake and clutch have plates 87, 88, respectively, which are keyed to shaft 94 for rotation therewith. An electric motor 89, which may be designated a forward motor, is connected to the other clutch plate 90 by shaft 91. When the electro-magnet 92 in clutch 86 is energized (and the electro-magnet 93 in brake 85 deenergized) the clutch plates are drawn together and motor 89 is coupled to the longitudinal carriage 32 by the drive train defined by shaft 91, clutch 86, shaft 84, sprocket 81, chain 80, sprocket 79, shaft 77, sprocket 78, chain 76, sprocket 75, shaft 74, sprocket 72, and chain 71. When the electro-magnet 93 in brake 85 is energzied (and the electro-magnet 92 deenergized) the plate 87 is engaged with the stationary brake housing 94 to stop rotation of shaft 84, and hence stop the forward movement (indicated by arrow F in FIGURE 4) of longitudinal carriage 32.

The other sprocket 81 is mounted on shaft 95 which extends through brake 96 to clutch 97. The shaft 95 is coupled to electric motor 98, which may be designated a reverse motor, when electro-magnet 99 in clutch 97 is energized (and electro-magnet 100 in brake 96 is deenergized), to move the carriage 32 in the directional sense indicated in FIGURE 4 by arrow G. When electro-magnet 100 in brake 96 is energized, and electro-magnet 99 in clutch 97 is deenergized, rotation of shaft 95 is stopped to stop carriage 32.

As shown in FIGURES 5 and 6, one of the stub shafts 74 has a pulley 101 which is connected by belt 102 to pulley 103. As shown in FIGURE 7, the pulley 103 is connected to a shaft 104 on which one plate of a clutch 105 is mounted. The other plate of clutch 105 is connected to shaft 106 which has a cam mechanism 107 mounted thereon comprising two cams 107a and 107b (see FIGURE 9). As shown in FIGURE 8, cam 107a operates switch 108a and cam 107b operates switch 108b. The clutch 105, which may be designated a null clutch, is small with relatively little inertia, and when electro-magnet 109 thereof (see FIGURE 6) is energized the cams almost instantly begin to rotate in accordance with longitudinal movement of the longitudinal carriage 32. The shaft 106 rotates counterclockwise (as viewed in FIGURE 8) when engaged with the carriage 32 as that carriage moves forwardly and rotates clockwise when engaged with the carriage 32 as that carriage moves in a reverse direction. When shaft 106 rotates counterclockwise to rotate cam 107b counterclockwise from a null position (shown in FIGURE 8) where the switch arm SAb of switch 108b is spaced from the rise Rb on cam 107b, switch 108b will be operated when the rise Rb reaches the switch arm SAb. When shaft 106 rotates clockwise to rotate cam 107a clockwise from a null position (shown in FIGURE 8) where the switch arm SAa of switch 108a is spaced from the rise Ra on the cam 107a, switch 108a will be operated when the rise Ra reaches the switch arm SAa. When the electro-magnet 109 of the clutch is deenergized, the cams are disengaged from the carriage and remain at rest until the electro-magnet 109 of clutch 105 is again engaged.

As shown best in FIGURE 5, the transverse carriage 34 has flanged rollers 110 received on the transverse tracks, or ways, 35 of longitudinal carriage 32, and the carriage 34 is suspended from these rollers to extend under the carriage 32. A cylinder 111, which is mounted on longitudinal carriage 32, has a piston (not shown) received therein. The piston is connected to a connecting rod 112 which has a clevis 112a connected to a bracket 34a mounted on the transverse carriage 34.

As shown best in FIGURE 10, the clamp 36, which grips the leading edge of a sheet 37 of plywood veneer, is suspended beneath the carriage 34. The clamp has a fixed jaw 140 extending along one edge of the carriage, and a pivotal jaw 141. Two cylinders 142 (only one of which is shown), mounted beneath the carriage 34, have pistons (not shown) which are connected by connecting rods 143 to the movable jaw. A source 144 of air under pressure is connected by pressure line 145 to the pressure port of pneumatic valve 146. Motor line 147 extends from the valve 146 to one end of both cylinders 142 and motor line 148 extends from the valve 146 to the other end of both cylinders 142. Movable valve member 149 is connected at one end to solenoid 150a, and at the opposite end to solenoid 150b. When solenoid 150a is energized to shift valve member 149 to the right (as viewed in FIGURE 10), air under pressure passes from the source 144 through valve 146 to line 147. This pressure advances the piston (and connecting rod 143) to swing the movable jaw closed. Air in front of the piston is expelled through line 148, valve 146, and out exhaust port 148a. When solenoid 150b is energized to shift valve member 149 to the left (as viewed in FIGURE 10), air under pressure is introduced to line 148 to retract the piston (and connecting rod 143) to swing jaw 141 open. Air behind the piston is vented through line 147, valve 146, and dischrage port 147a.

The patcher 29 is a convenient machine of the type shown, for example, in U.S. Patent 2,336,704 issued to P. F. Skoog on Dec. 14, 1943. As described in that patent, the machine is operable automatically to cut a defect out of a sheet of plywood veneer, cut a patch from a patch blank to fit the opening from which the defect was cut, and insert the patch in the opening. The machine has a clamping shoe which is actuated by the introduction of air under pressure into a chamber to clamp down on the plywood veneer sheet and hold the veneer sheet over a fixed die. A knife, which is actuated by a pneumatically actuated diaphram, descends inside the clamping shoe to cut the defect out of the plywood veneer. A pressure foot, which is actuated by the introduction of air under pressure into a cylinder, forces the cut-out defect out of the veneer sheet. A patch blank is shifted into registration with the die by a carrier bar which is moved in one direction or the other by the introduction of air to one end or the other of a cylinder. A ram, which is actuated by a pneumatically operated diaphram, is raised to force the patch blank through the die, thereby trimming the blank to size. The ram inserts the trimmed blank into the opening in the veneer sheet from which the defect was removed.

As shown in FIGURE 12A, the photomultiplier tube 52A responds to light from lamp 55 which is reflected from the rotating mirror onto the tube 52A to indicate the beginning of a scanning pass across the board. Photomultiplier tube 52A is connected to inverter 290 which is connected by line 291 to the input set terminal 292 of flip-flop 293. Photomultiplier tube 52B is connected to inverter 294 which is connected to Schmitt trigger circuit 295. A signal from trigger circuit 295 is transmitted by line 296 to an input terminal of NOR gate circuit 297. Photomultiplier tube 52C is connected to inverter 298 which is connected by line 299 to the input reset terminal 300 of flip-flop 293. The photomultiplier tubes 52A, 52B and 52C have circuitry to produce a negative voltage of magnitude proportional to light intensity. The output terminal 301 of flip-flop 293 (marked with a "1" to indicate a positive voltage is applied to the set input terminal 292) is not used. The other output terminal of flip-flop 293 (marked with a 0 to indiate no positive voltage output when a positive voltage input is applied to the set input terminal) is connected by line 306 to an input terminal of NOR gate circuit 297.

The output terminal of NOR gate circuit 297 is connected by line 311 to the input set terminal 312 of flip-flop 313. Only output terminal 314 of flip-flop 313 is utilized, and that terminal is connected by line 315 to the input terminal of monostable, or one shot, circuit 316 (see FIGURE 12B), by line 320 to an input terminal of an OR circuit 321, by line 322 to the input terminal of AND circuit 323, and by line 324 to terminals of switches 108a and 108b. Monostable circuit 316, upon receiving a signal from output terminal 314, produces a single pulse of 150 milliseconds duration.

The output terminal of OR circuit 321 is connected by line 340 to the reset input terminal 341 of flip-flop 342. The only output terminal utilized, terminal 343, is connected by line 344 to an input terminal of OR circuit 345. The output terminal of OR circuit 345 is connected by line 346 to an inverter 347 which, in turn, is connected by line 348 to an input terminal of NOR circuit 297. The output terminal of OR circuit 345 is also connected by line 349 to the input terminal of amplifier 350, the output terminal of which is connected to forward clutch coil 92. A start switch 351 (FIGURE 12B) is connected between a source 352 of positive voltage and an input terminal of OR circuit 353. The output terminal of circuit 353 is connected by line 354 to the set input terminal 355 of flip-flop 342.

The output terminal of AND circuit 323 is connected by line 360 to an input terminal of OR circuit 361. The output terminal or OR circuit 361 is connected by line 362 to the input terminal of amplifier 363, the output terminal of which is connected to brake coils 93 and 100 (FIGURE 6).

The terminals of normally open contacts of switches 108a and 108b opposite those connected to line 324 are connected, respectively, to lines 364 and 365. Line 364 is connected to input terminals on OR circuit 345 and OR circuit 366. Line 365 is connected to input terminals on OR circuit 366 and 367. The output terminal of OR circuit 366 is connected to the input of an inverter 368, the output of which is connected by line 369 to an input terminal of AND circuit 323. The output terminal of OR circuit 367 is connected by line 367a to the input terminal of amplifier 367b, the output terminal of which is connected reverse clutch coil 99 (FIGURE 6).

The output of monostable circuit 316 is connected by line 370 to the input terminal of amplifier 371, the output terminal of which is connected to null clutch coil 109.

Limit switch 10LS is mounted on stop 151 (see FIGURE 4) which is secured on carriage 34. The stop, which has a hard rubber bumper, engages the plunger 153 of shock absorber 154 when the carriage 34 is returned to the scan position. The shock absorber 154, which is mounted on longitudinal carriage 32, has a dog 155 thereon which momentarily operates limit switch 10LS when the shock absorber plunger is fully retracted (as shown in FIGURE 4) and the carriage 34 has reached its extreme left hand (or scan) position on carriage 32 (FIGURE 1).

One contact of the normally open contacts 10LS1 of limit switch 10LS is connected to a source 410 of voltage (FIGURE 12B). The other contact thereof is connected through line 413 to an input terminal of OR circuit 353, through line 414 to reset input terminal 415 of flip-flop 313, and through line 409 to the input terminal of inverter 416. The output terminal of inverter 416 is connected by line 417 to an input terminal of OR circuit 361.

One contact 418, 419, respectively, of each of the normally open contacts of limit switches 12LS and 13LS (FIGURE 4) are connected to a source 420 of positive voltage. The opposite contacts 421, 422 of switches 12LS and 13LS are connected, respectively, by lines 423, 424 to input terminals of OR circuit 425. The contact 421 is also connected by line 426 to the set input terminal 427 of flip-flop 428, and by line 429 to an input terminal of OR circuit 321. Contact 422 is connected by line 430 to the reset input terminal 431 of flip-flop 428, and by line 432 to the open clamp valve solenoid 150b. The output terminal of OR circuit 425 is connected by line 433 to the input terminal of monostable circuit 434. The output terminal of circuit 434 is connected by line 435 to an input terminal of OR circuit 361. The output terminal 436 of flip-flop circuit 428 is connected by line 437 to an input terminal of OR circuit 367.

A manually operated switch 440 is connected between a source 441 of positive voltage and the set terminal 442 of flip-flop circuit 443. The output terminal 444, which is the only output terminal of the circuit utilized, is connected to the close clamp solenoid 150a. Terminal 422 of switch 13LS is connected by line 445 to the reset terminal 446 of flip-flop circuit 443.

The approach of the longitudinal carriage 32 to the two extreme positions is indicated by the two limit switches 12LS and 13LS, as shown in FIGURE 4. Dog 450 extends from one side of the longitudinal carriage 32. Limit switch 12LS is connected to the rear of the frame 30 for momentary operation by dog 450 when the carriage 32 approaches the extreme rearward position (with the trailing edge of a sheet of plywood veneer gripped by clamp 36 under the scanner). Limit switch 13LS is connected to the front of the frame 30 for momentary operation by dog 450 when the carriage 32 approaches the extreme front position (with the clamp 36 and the leading edge of a sheet of plywood veneer received therein under the scanner). In both instances, the momentum of the carriage 32 carries the dog 450 past the limit switch. Both limit switches 12LS and 13LS are of the type which are operated (to actuate the contacts thereof) when tripped in one direction only; tripping in the opposite direction will have no effect on the contacts. The contacts of switch 13Ls are actuated only as the dog 450 moves from left to right in FIGURE 4; the contacts of limit switch 12LS are actuated only as the dog 450 moves from right to left in FIGURE 4.

At the beginning of a cycle of operation, the carriage 32 is forward and the carriage 34 is in the scan position on carriage 32 as shown in FIGURE 11A. All limit switches are unoperated.

The operator manually inserts an unprocessed sheet of plywood veneer 37 from stack 25 into clamp 36, as shown in FIGURE 11A, and closes push button switch 440 momentarily. The actuation of switch 440 energizes solenoid 150a, through flip-flop circuit 443, to close the clamp and grip the leading edge of the sheet of plywood veneer. The operator also starts motor 44 by actuation of switch 470 to connect the motor across a source of energy 471. Motor 44 runs continuously during operation of the automatic patching machines. Switch 490 is closed to connect the motors 89 and 98, which run continuously during operation of the machine, across energy source 471. The operator then momentarily closes push button switch 351 (FIGURE 12B) to energize the forward clutch coil 92 (FIGURE 12A) through OR circuit 353, flip-flop circuit 342, OR circuit 345, and amplifier 350.

It should be noted that the defects occur at random on each sheet of plywood veneer. The energization of forward clutch coil 92 (see FIGURE 6) connects the forward motor 89 to the longitudinal carriage 32 and commences forward longitudinal movement of carriage 32. Carriage 32 carries with it carriage 34 and the plywood veneer sheet gripped thereby. As the sheet progresses longitudinally under the scanner, the three photomultiplier tubes, in conjunction with the rotating mirror holder and the six mirrors thereon, scan across the plywood sheet.

At the beginning of each pass, photomultiplier tube 52A responds to lamp 55 to send a negative signal to inverter 290 which inverts the signal and transmits it to set terminal 292 of flip-flop circuit 293. A positive voltage signal at set terminal 292 produces a zero voltage output at terminal 305 of circuit 293. The zero voltage output at terminal 305 conditions NOR gate 297 for operation when a defect is detected. At the end of each pass, photomultiplier tube 52C responds to lamp 54 to send a negative reference signal to inverter 298 which inverts the signal and transmits it to reset terminal 300 of flip-flop circuit 293. A positive voltage at reset terminal 300 produces a positive voltage output at terminal 305. The positive voltage output at terminal 305 of flip-flop circuit 293 closes the NOR gate 297 so that photomultiplier tube 52B, which has completed the scanning pass, will be ineffective.

When a defect is detected, as shown in FIGURE 11B, the photomultiplier tube 52B responds to the shadows or dark area caused by the defect 25a to produce a signal, indicated at 451, which is transmitted through inverter 294 and trigger circuit 295 to line 296. Since the defect signal in line 296, which comprises a drop in voltage, occurs within the scan area defined by boundary lines D and E, FIGURE 2 (so that there is no signal in line 306) and occurs while the forward motor is advancing the sheet (so that there is no signal in line 348), the NOR circuit 297 signals a defect at set terminal 312 of flip-flop 313 to produce a defect signal at the flip-flop output terminal 314. This defect signal is communicated from terminal 314 to monostable 316, to AND circuit 323, and to OR circuit 321. The signal sent to the monostable circuit 316 causes energization of null clutch coil 109; the signal sent to AND circuit 323 energizes brake coils 93 and 100; and the signal sent to OR circuit 321 produces a signal at reset terminal 341 of flip-flop circuit 342. The signal at reset terminal 341 of flip-flop circuit 342 removes the voltage from line 344 to deenergize the forward clutch coil 92 and disengage the forward motor 89 (FIGURE 6) from the longitudinal carriage. Since at this time, there is no signal at either input terminal of OR circuit 366, a signal is produced in line 369 by inverter 368. Thus, the moment the defect signal was transmitted to AND circuit 323, the brake coils 93, 100 (FIGURE 6) became energized. The signal to monostable circuit 316 produces a pulse of 150 milliseconds and the null clutch coil 109 (FIGURE 6) is energized for the duration of this pulse.

At the same time that the forward drive is disconnected from the longitudinal carriage 32, the cams 107a and 107b (FIGURE 6) which are initially in a null position, are connected to the carriage by energization of null clutch coil 109 for rotation of the cams from the null position as momentum carries the longitudinal carriage 32 beyond the position at which a defect was detected as shown in FIGURE 11C. As the longitudinal carriage 32 moves beyond the position where the defect was detected, the switch 108b (FIGURE 8) is closed to remove the signal from AND circuit 323 and thereby release the brakes by the deenergization of brake coils 93, 100. At the same time, a signal is transmitted to OR circuit 367 by line 365, and reverse clutch coil 99 (FIGURE 6) is energized to connect the reverse motor 98 to the longitudinal carriage 32.

The reverse motor drives the carriage 32 back toward the scanner to bring the defect in the plywood sheet back to the position it occupied when the defect was detected, as shown in FIGURE 11D. If the carriage then overshoots the null, or defect, position in the opposite direction, as shown in FIGURE 11E, switch 108b is opened and switch 108a is closed (FIGURE 8) to deenergize reverse clutch coil 99 and transmit a signal to an input of OR circuit 345. A signal to an input of OR circuit 345 again energizes clutch 92 (FIGURE 6) to thereby connect the forward motor 89 to the longitudinal carriage 32.

If either switch 108a or 108b is closed, the brakes are released. If neither is closed, the brakes are applied. Thus, within 150 milliseconds, the longitudinal carriage 32 is at rest in the null, or defect, position, as shown in FIGURE 11F.

It will be noted that the null clutch and cam mechanism controlled thereby define memory mechanism which indicate the longitudinal position of a veneer sheet when a defect is detected by engaging with the drive mechanism. This memory mechanism serves to return the veneer sheet to the position it occupied when the defect was detected.

The carriage 34 carries the plywood veneer sheet to patcher 29, as shown in FIGURE 11G. After the defect has been cut out, and a patch inserted, the carriage 34 returns the plywood veneer sheet to the scan position, as shown in FIGURE 11H. The sheet is returned to the same position it occupied when the defect was detected.

When the transverse carriage 34 is returned from the patch position to the scan position, the contacts 10LS1 (FIGURE 22) of limit switch 10LS are closed, and a signal is sent to OR circuit 353. This signal is transmitted to the set terminal 355 of flip-flop circuit 342 which sends a signal to OR gate 345 and again energizes forward clutch 92. The signal from OR circuit 345 is transmitted through line 346, inverter 347, and line 348 to NOR circuit 297 to again condition the scanner for detection of defects.

The plywood veneer sheet continues longitudinal movement until another defect is detected. When this occurs, the plywood sheet is again stopped and returned longitudinally, with the aid of the null clutch, to the point of detection, and then shifted laterally until the defect is under the patcher. After the defect is removed and replaced with a patch, the plywood sheet is again shifted back to the scan position under the scanner for resumption of longitudinal feed and scanning.

It is not desirable to patch a defect on the trailing edge of the board, since the patch would extend beyond the edge of the board, so limit switch 12LS (FIGURE 4), which terminates scanning and patching of a sheet, is positioned for operation before the trailing edge is directly under the scanner. Limit switch 12LS, which is connected to the rear of frame 30, is momentarily operated by dog 450 on the longitudinal carriage when the plywood sheet is in its extreme forward position as shown in FIGURE 11I. When switch 12LS is operated, the contacts 12LS1 (FIGURE 12B) thereof close and a signal is sent both to OR circuit 425 and OR circuit 321 (FIGURE 12A). OR circuit 425 triggers monostable circuit 434 which produces a 0.1-second pulse at an input to OR circuit 361. Circuit 361, acting through amplifier 363, causes energization of brake coils 93 and 100 for 0.1 second to stop the longitudinal travel of carriage 32. OR circuit 321 produces a pulse at input reset terminal 341 of flip-flop circuit 342 to drop the positive voltage to OR circuit 345 and release forward clutch 92. The closing of limit switch contacts 12LS1 also produces a pulse at input set terminal 427 of flip-flop circuit 428 which produces a positive voltage at output terminal 436 of circuit 428. This voltage is transmitted by line 437 to OR circuit 367 to energize, through amplifier 367b, the reverse clutch coil 99 (FIGURE 6).

With the reverse clutch coil 99 energized, the reverse motor 98 is connected to carriage 32 through the clutch 97 to move the longitudinal carriage back to the initial starting position thereof shown in FIGURE 11A. When the carriage 32 reaches the starting position, switch 13LS is momentarily operated to close contacts 13LS1 (FIGURE 12B). Closing of contacts 13LS1 initiates a signal which acts through OR circuit 425, monostable circuit 434, OR circuit 361, and amplifier 363, to again energize, for 0.1 second, brake coils 93 and 100. At the same time solenoid 150b (FIGURE 10) is energized to open the clamp 36. This permits the operator to remove the patched sheet and place it on the stack 26. The operator then inserts an unprocessed sheet from stack 25 into the clamp and the operating cycle is repeated.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, we claim:

1. In a sheet patching machine having means defining a reversible drive to move the sheet in one directional sense or the other along a longitudinal path, said machine having a scanner to detect a defect in the moving sheet and having means to terminate the drive in one directional sense in response to detection of a defect in the moving sheet, the combination comprising means responsive to operation of the scanner to indicate the instantaneous longitudinal position of the sheet when said defect is detected, and control means operable in response to said indicating means to return the sheet to said instantaneous position.

2. In a machine for patching plywood veneer having means defining a reversible drive to move the plywood veneer in one directional sense or the other along a longitudinal path, said machine having a scanner to detect a defect in the moving plywood veneer and having means to reverse said drive in response to operation of the scanner on detection of a defect in the moving plywood veneer, said machine having a patcher in the same longitudinal position as said scanner but displaced laterally therefrom, the combination comprising memory means responsive to operation of the scanner and operable by the drive to indicate the instantaneous longitudinal position of the plywood veneer when said defect is detected, and control means operable in response to said memory means to return the plywood veneer longitudinally for repair of the defect therein by the patcher.

3. The mechanism of claim 2 in which said means to indicate the instantaneous longitudinal position of the plywood veneer when said defect is detected includes a cam mechanism and includes means to engage said cam mechanism with said drive in response to operation of said scanner when a defect is detected in said moving plywood veneer.

4. The mechanism of claim 3 in which said means to engage said cam mechanism with said drive in response to operation of said scanner when a defect is detected includes an electro-magnetic clutch.

5. The mechanism of claim 3 in which said cam mechanism is engaged with said drive in a null position for rotation away from said null position, and in which said control means effects reverse operation of said drive until said cam mechanism rotates back to said null position.

6. The mechanism of claim 2 in which said reversible drive includes a first electric motor to move the plywood veneer in one directional sense and includes a second electric motor to move the plywood veneer in the reverse directional sense.

7. The mechanism of claim 6 in which a electromagnetic clutch is included in the drive to connect the first motor for moving the plywood veneer in one directional sense and in which a second clutch is included in the drive to connect the second motor for moving the plywood veneer in the opposite directional sense.

8. The mechanism of claim 7 in which said means to reverse said drive in response to operation of said scanner comprises means to disengage said first clutch and simultaneously to engage said second clutch.

9. In a machine for patching plywood veneer having a reversible drive to move the plywood veneer along a longitudinal path, said drive including a first continuously running electric motor and a second continuously running electric motor, a first electromagnetic clutch to render when engaged said first motor effective to move the plywood veneer in one directional sense and a second electro-magnetic clutch to render when engaged said second motor effective to move the plywood veneer in the opposite directional sense, said machine having a scanner and a patcher in the same longitudinal position but spaced apart laterally, said scanner producing a defect signal when a defect is detected in the plywood, the improvement comprising a rotatable cam mechanism having a null position, a third clutch operable in response to said defect signal to rotate said cam mechanism from said null position in accordance with movement of the plywood veneer from the position in which the defect was detected by the scanner, control means operable in response to rotation of the cam mechanism in one directional sense from said null position to energize the first clutch and deenergize the second clutch and operable in response to rotation of the cam mechanism in the opposite directional sense from said null position to deenergize the first clutch and energize the second clutch.

10. The mechanism of claim 9 including braking mechanism and including means responsive to positioning of the cam mechanism in the null position to actuate said braking mechanism.

References Cited

UNITED STATES PATENTS

| | | | |
|---|---|---|---|
| 3,141,589 | 7/1964 | Jochim | 83—371 |
| 3,165,961 | 1/1965 | Hammond | 83—371 |
| 3,191,857 | 6/1965 | Galey et al. | 83—371 |
| 3,192,813 | 7/1965 | Berberick | 83—371 |

GERALD A. DOST, *Primary Examiner.*

U.S. Cl. X.R.

83—367; 144—3

UNITED STATES PATENT OFFICE
CERTIFICATE OF CORRECTION

Patent No. 3,446,256            May 27, 1969

Thomas E. Roberts, Jr., et al.

It is certified that error appears in the above identified patent and that said Letters Patent are hereby corrected as shown below:

Column 2, line 70, "of", first occurrence, should read -- in --. Column 3, line 32, "stack of" should read -- stack --. Column 4, line 30, "thes" should read -- the --. Column 6, line 20, "convenient" should read -- conventional --; line 62, after "terminal" insert -- 305 --. Column 8, line 29, "13Ls" should read -- 13LS --. Column 11, line 50, after "a" insert -- first --. Column 12, line 25, "accordance" should read -- coordination --.

Signed and sealed this 10th day of November 1970.

(SEAL)
Attest:

Edward M. Fletcher, Jr.           WILLIAM E. SCHUYLER, JR.
Attesting Officer                   Commissioner of Patents